US012792416B2

(12) United States Patent
Wang

(10) Patent No.: US 12,792,416 B2
(45) Date of Patent: Nov. 10, 2026

(54) EFFICIENT GPU RESOURCE ALLOCATION OPTIMIZATION METHOD AND SYSTEM

(71) Applicant: INSPUR SUZHOU INTELLIGENT TECHNOLOGY CO., LTD., Suzhou (CN)

(72) Inventor: Bin Wang, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 768 days.

(21) Appl. No.: 18/011,831

(22) PCT Filed: Jan. 12, 2021

(86) PCT No.: PCT/CN2021/071213
§ 371 (c)(1),
(2) Date: Dec. 20, 2022

(87) PCT Pub. No.: WO2022/001086
PCT Pub. Date: Jan. 6, 2022

(65) Prior Publication Data

US 2023/0244537 A1 Aug. 3, 2023

(30) Foreign Application Priority Data

Jun. 29, 2020 (CN) ........................ 202010601888.X

(51) Int. Cl.
*G06F 9/50* (2006.01)

(52) U.S. Cl.
CPC .................................. *G06F 9/5044* (2013.01)

(58) Field of Classification Search
CPC .......... G06F 9/5044; G06F 9/505; G06F 9/50; Y02D 10/00
See application file for complete search history.

(56) References Cited

U.S. PATENT DOCUMENTS 10,325,343 B1 * 6/2019 Zhao .................. H04L 67/1042
11,544,113 B2 * 1/2023 Wang .................... G06F 9/5016
(Continued)

FOREIGN PATENT DOCUMENTS

CN 109995862 A 7/2019
CN 110543362 A 12/2019
CN 111930498 A 11/2020

OTHER PUBLICATIONS

Amaral, Marcelo, et al. "Topology-aware gpu scheduling for learning workloads in cloud environments." Proceedings of the International Conference for High Performance Computing, Networking, Storage and Analysis. 2017.
(Continued)

*Primary Examiner* — Peng Ke
(74) *Attorney, Agent, or Firm* — IPro, PLLC

(57) ABSTRACT

An efficient GPU resource allocation optimization method and system. The method includes: invoking an allocation interface for GPUs; acquiring GPU resources and data information needed for GPU allocation, the data information comprising a physical topology diagram structure, a NUMA packet structure, and operation information; determining a GPU topology communication factor according to a GPU static topology diagram in physical topology diagrams; determining a GPU fragmentation factor according to the NUMA packet structure and the operation information by adding a correction during GPU fragment computation; and performing weighted computation on the obtained communication factor and the obtained fragmentation factor to determine a target function value, the minimum target function value corresponding to an optimal GPU resource allocation scheme.

11 Claims, 3 Drawing Sheets

(56) References Cited

U.S. PATENT DOCUMENTS

| | | | | |
|---|---|---|---|---|
| 11,615,295 | B2 * | 3/2023 | Zhu | G06F 15/17318 706/15 |
| 2018/0276044 | A1 | 9/2018 | Fong et al. | |
| 2019/0312772 | A1 * | 10/2019 | Zhao | H04L 41/12 |
| 2020/0327036 | A1 * | 10/2020 | Zhao | G06F 11/3065 |
| 2023/0315621 | A1 * | 10/2023 | Bahirat | G06F 12/0835 |

OTHER PUBLICATIONS

PCT/CN2021/071213 international search report.

* cited by examiner

EFFICIENT GPU RESOURCE ALLOCATION OPTIMIZATION METHOD AND SYSTEM

The present disclosure claims the priority of Chinese patent application filed on Jun. 29, 2020 before the CNIPA, China National Intellectual Property Administration with the application number of 202010601888.X and the title of "EFFICIENT GPU RESOURCE ALLOCATION OPTIMIZATION METHOD AND SYSTEM", which is incorporated herein in its entirety by reference.

FIELD

The present disclosure belongs to the technical field of graphics processing unit (GPU) resource allocation and more particularly, relates to an efficient GPU resource allocation optimization method and system.

BACKGROUND

At present, some related graphics processing unit (GPU) allocation technologies used in systems in high performance calculation and artificial intelligence (AI) platform fields have been implemented, for example, a GPU topology partitioning method and apparatus and the like. The implementation principle is as follows: a plurality of GPUs in a GPU topology graph are randomly divided into two partitions, a migration gain of all the GPUs in the GPU topology graph is calculated and is used for determining an interconnecting bandwidth among the plurality of GPUs according to physical topology information of the plurality of GPUs and generating a GPU topology graph including the plurality of GPUs. Finally, a topology graph partitioning solution with the minimal number of connections across partitions is selected as a partitioning result. This technology achieves optimal selection based on a communication link between every two GPU cards in the platform without considering the type and the characteristics of a running job in the system: there are numerous running calculation jobs in a cluster system, priority scheduling orders are different, and different jobs have different resource (for example, the number of the GPUs) requirements.

According to the above original GPU topology graph method, a job firstly scheduled has a higher priority to use GPU resources according to a non uniform memory access (NUMA) packet; and then GPU resource allocation fragments easily appear, so that some jobs may not get the GPU resources for running due to an insufficient availability ratio of the NUMA packet, which results in unnecessary waste of the GPU resource performance and then weakens the use efficiency of calculation resources of the system platform. So, it requires an optimization design on an allocation algorithm of the GPU resources of the system, in which both static communication physical topology graphs of the GPUs and resource fragments generated by the jobs dynamically using the GPUs require to be considered, so as to meet high performance of the system, for example: a job training speed of an AI system is increased by optimizing allocation of the GPUs.

SUMMARY

In order to solve the above technical problems, the present disclosure provides an efficient GPU resource allocation optimization method and system, which may obtain GPU optimal selection required by a to-be-scheduled job according to a currently running job on the system and the use condition of the GPU resources.

In order to achieve the above objects, the present disclosure uses the following technical solutions:

an efficient graphics processing unit resource allocation optimization method, including:

S1: acquiring graphics processing unit resources and data information required by graphics processing unit allocation, wherein the data information includes a graphics processing unit physical topology graph structure, a non uniform memory access packet structure and job information;

S2: according to a graphics processing unit static topology graph in a graphics processing unit physical topology graph, determining a graphics processing unit topology communication factor, and according to the non uniform memory access packet structure and the job information, determining a graphics processing unit fragmentation factor by adding a correction during graphics processing unit fragment calculation; and S3: performing a weighted calculation on the obtained communication factor and fragmentation factor to determine a target function value, wherein on the condition that the target function value is minimal, this solution is an optimal allocation solution for the graphics processing unit resources.

In an embodiment of the present disclosure, before execution of operation S1, the method further includes: calling a graphics processing unit allocation interface, wherein the allocation interface is configured to acquire the graphics processing unit resources required by graphics processing unit allocation.

In an embodiment of the present disclosure, after execution of operation S3, the method further includes: updating the optimal allocation solution for the graphics processing unit resources, and completing persistence.

In an embodiment of the present disclosure, an expression of determining the graphics processing unit topology communication factor according to the graphics processing unit static topology graph in the graphics processing unit physical topology graph is as follows:

$$GpusCommunicateCost = \sum_i^n \sum_j^n GpuCommCost(i, j), \forall i \neq j$$

wherein GpusCommunicateCost is the graphics processing unit topology communication factor; i is a row of a graphics processing unit square matrix in the graphics processing unit static topology graph; j is a column of the graphics processing unit square matrix in the graphics processing unit static topology graph; and n is a number of graphics processing unit cards.

In an embodiment of the present disclosure, an expression of, according to the non uniform memory access packet structure and the job information, determining the graphics processing unit fragmentation factor by adding a correction during graphics processing unit fragment calculation is as follows:

$$GpusFragmentCost = \left[\left(\sum_1^{sockets} (FreeGpusSocket(i)/TotalGpusSocket(i))\right)/ \text{sockets}\right] - MinFrags,$$

wherein GpusFragment is the graphics processing unit fragmentation factor; FreeGpusSocket(i) is the number of rest free available gpus in a socket packet after to-be-allotted gpus in an $i^{th}$ socket packet is calculated; TotalGpusSocket(i) is to calculate the number of all the gpus in the $i^{th}$ socket packet; sockets is the number of non uniform memory access packets; and min_frags is a correction parameter.

In an embodiment of the present disclosure, an expression of performing a weighted calculation on the obtained graphics processing unit communication factor and the graphics processing unit fragmentation factor to determine the target function value is as follows: $Y=\alpha$*GpusCommunicateCost+$\beta$*GpusFragmentCost;

wherein Y is the target function; $\alpha$ is a communication factor coefficient; $\beta$ is the fragmentation factor; and $\alpha+\beta=1$.

The present disclosure further provides an efficient graphics processing unit resource allocation optimization system, including a graphics processing unit allocation module, a graphics processing unit state machine module and a snapshot module;

wherein the graphics processing unit allocation module is configured to acquire the graphics processing unit resources by calling the graphics processing unit allocation interface, acquire the graphics processing unit data information from the graphics processing unit state machine module, calculate the graphics processing unit topology communication factor and the graphics processing unit fragmentation factor according to the acquired graphics processing unit resources and graphics processing unit data information, perform a weighted calculation on the obtained graphics processing unit communication factor and the graphics processing unit fragmentation factor to determine the target function value and call the snapshot module;

the graphics processing unit state machine module is configured to provide the graphics processing unit data information for the graphics processing unit allocation module, edit job information and update the non uniform memory access packet at the same time; and the snapshot module is configured to store the updated optimal allocation solution for the graphics processing unit resources.

In an embodiment of the present disclosure, the graphics processing unit data information includes the graphics processing unit physical topology graph structure, the non uniform memory access packet structure and the job information.

In an embodiment of the present disclosure, the process that the graphics processing unit allocation module calculates the graphics processing unit topology communication factor and the graphics processing unit fragmentation factor according to the acquired graphics processing unit resources and graphics processing unit data information and performs weighted calculation on the obtained graphics processing unit communication factor and the graphics processing unit fragmentation factor to determine the target function value includes:

determining the graphics processing unit topology communication factor according to the graphics processing unit static topology graph in the graphics processing unit physical topology graph;

determining the graphics processing unit fragmentation factor according to the non uniform memory access packet structure and the job information by adding a correction during graphics processing unit fragment calculation; and performing a weighted calculation on the obtained communication factor and fragmentation factor to determine a target function value, wherein on the condition that the target function value is minimal, this solution is the optimal allocation solution for the graphics processing unit resources.

The effects provided in the content of the present disclosure are only effects of the embodiments, rather than all the effects of the present disclosure. One of the above technical solutions has the following advantages or beneficial effects that:

The present disclosure provides an efficient GPU resource allocation optimization method and system. The method includes: calling a GPU allocation interface to acquire GPU resources and GPU data information required by GPU allocation, wherein the data information includes a GPU physical topology graph structure, a NUMA packet structure and job information. According to a GPU static topology graph in a GPU physical topology graph, a GPU topology communication factor is determined; and according to the NUMA packet structure and the job information, a GPU fragmentation factor is determined by adding a correction during GPU fragment calculation. Weighted calculation is performed on the obtained communication factor and fragmentation factor to determine a target function value; and when the target function value is minimal, this solution is the optimal allocation solution for the GPU resources. The efficient GPU resource allocation optimization method provided based on the present disclosure further provides an efficient GPU resource allocation optimization system. According to the present disclosure, allocation of the GPU resources may guarantee the calculation performance of the GPUs and may further greatly reduce generation of the GPU resource fragments, so that the present disclosure adapts to GPU resource allocation in a scenario with multiple service types and multiple resource demands, guarantees that each scheduling job may use an optimal configuration of currently available GPU resources, prevents a performance difference in allocation results due to different job types and resource demands and further improves the use efficiency of the GPU resources of the cluster system. For a high-performance cluster calculation job and a training task of the AI platform, running speeds and numbers may be obviously increased; and finally, a value of an average revenue per user (ARPU) of a platform service is increased.

DETAILED DESCRIPTION

Figure 1:
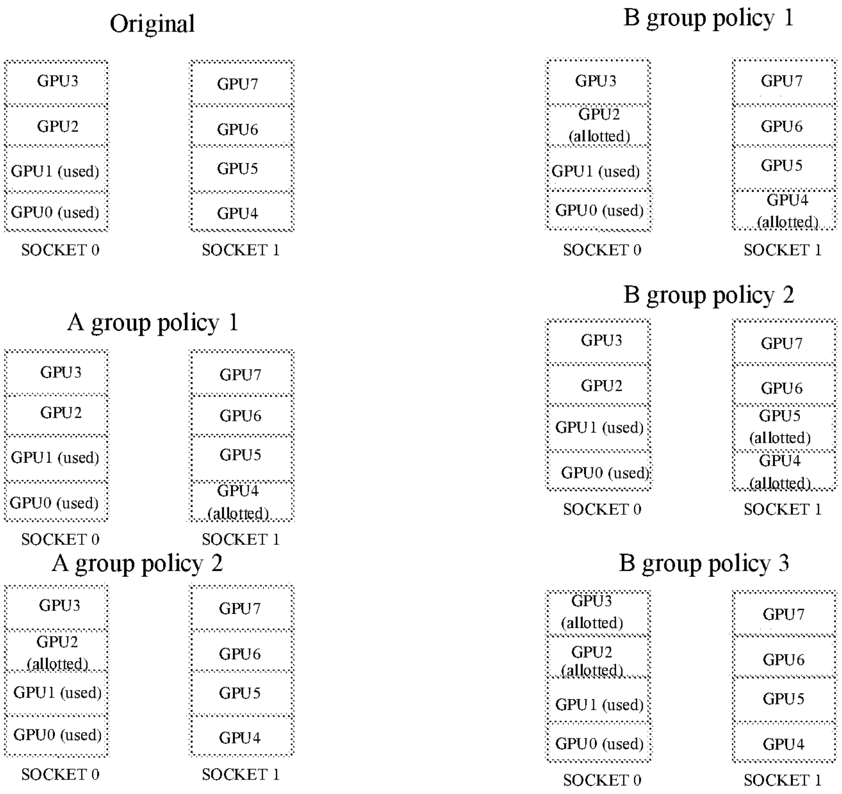
FIG. 1 is a schematic diagram of a graphics processing unit (GPU) allocation policy in embodiment 1 of the present disclosure.

In order to clearly explain the technical features of the solution, the present disclosure is described in detail below through specific embodiments and in combination with the drawings. The following disclosure provides many different embodiments or examples for implementing different structures of the present disclosure. In order to simplify the disclosure of the present disclosure, the components and settings of specific examples are described below. In addition, the present disclosure may repeatedly refer to numbers and/or letters in different examples. This repetition is for the purpose of simplification and clarity, and does not in itself indicate the relationship between the various embodiments and/or settings discussed. It should be noted that the components illustrated in the drawings are not necessarily drawn to scale. The present disclosure omits the description of well-known components and processing techniques and processes to avoid unnecessary limitation of the present disclosure.

Embodiment 1 of the present disclosure provides an efficient graphics processing unit (GPU) resource allocation optimization method, which may obtain GPU optimal selection required by a to-be-scheduled job according to a currently running job on a system and the use condition of GPU resources. An algorithm takes a communication physical topology graph of a GPU into consideration, and more importantly, uses a concept of a GPU resource allocation fragment. The present disclosure makes optimal selection while measuring physical resources of GPUs and the job use rate of the GPUs. In this way, the algorithm achieves double-dimension joint scheduling of the resources and jobs and then may more comprehensively calculate an optimal solution.

Figure 2:
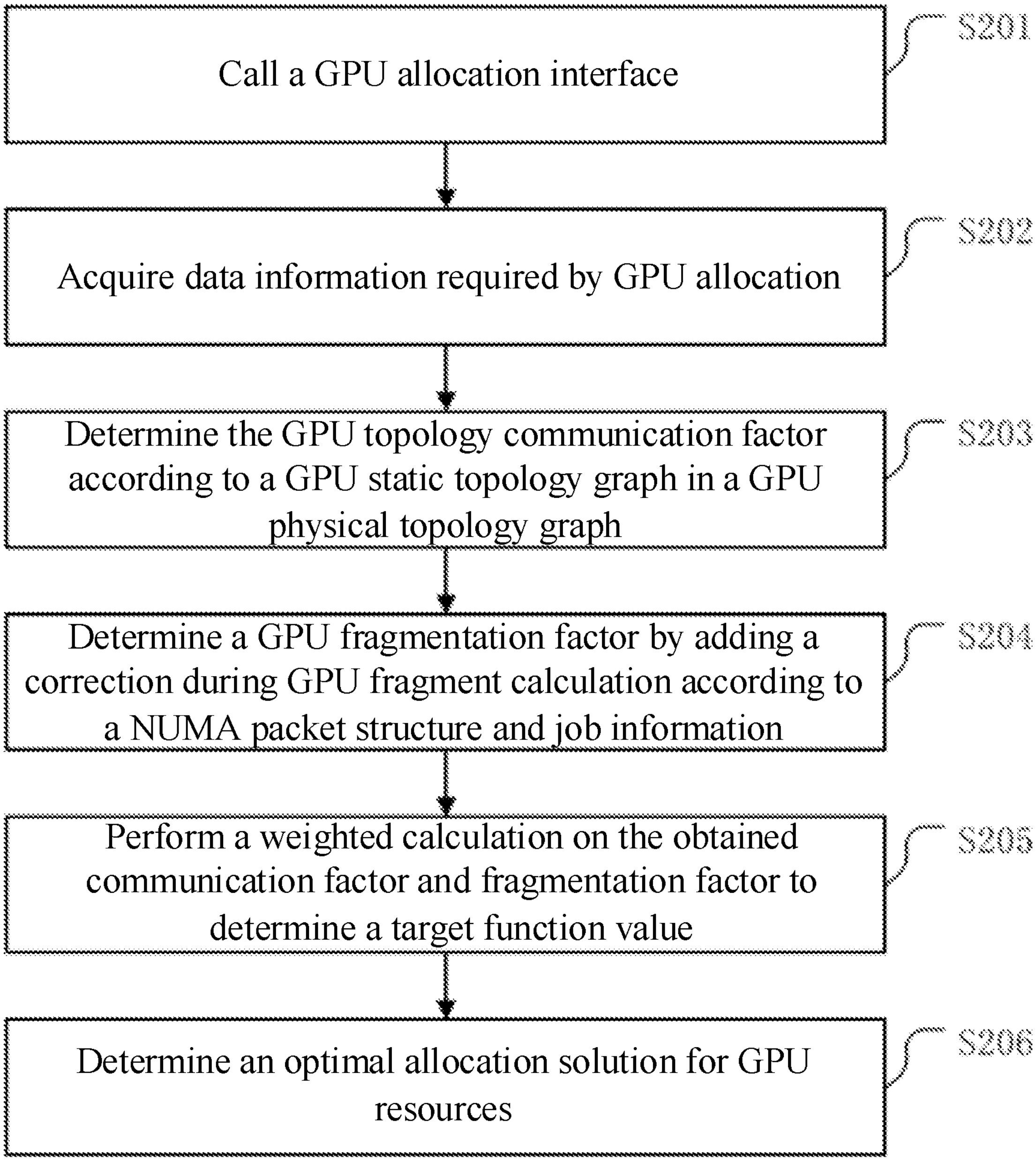
FIG. 2 is a flow chart of an efficient GPU resource allocation optimization method in embodiment 1 of the present disclosure.

FIG. 1 is a schematic diagram of a GPU allocation policy in embodiment 1 of the present disclosure. The GPU allocation fragment makes a consideration in the aspect of the use efficiency of the GPUs; and from the view of a scheduling policy, the GPU resources are allocated in a non uniform memory access (NUMA) packet socket with a high use rate of the GPUs as much as possible. In FIG. 1, there are two socket packets socket-0 and socket-1, and there are 2 GPUs which are used in the socket-0. Under the condition that one more GPU requires to be allotted, an A group policy 2 is a policy meeting a minimal degree of GPU allocation fragments. Under the condition that two more GPUs require to be allotted, a B group policy 3 is the policy meeting minimal GPU allocation fragments. A GPU fragment index may be represented by a GPU idle rate of an average socket. The greater the value is, it shows that the higher the fragmentation degree is; and the less the value is, the lower the fragmentation degree is. The allocation algorithm expects that the allotted GPU resources make a value of the GPU fragment index minimal. However, the fragment index is not directly and simply equal to the idle rate; for example, under the condition that the idle percentage is 100%, it may not simply consider, based on the numerical value, that a maximal fragment is generated. The present disclosure gives an efficient GPU resource allocation optimization method. FIG. 2 is a flow chart of an efficient GPU resource allocation optimization method in embodiment 1 of the present disclosure.

In step S201, calling a GPU allocation interface, and the allocation interface is configured to acquire GPU resources required by GPU allocation.

In step S202, acquiring data information required by GPU allocation, wherein the data information includes a GPU physical topology graph structure, a NUMA packet structure and job information.

Figure 3:
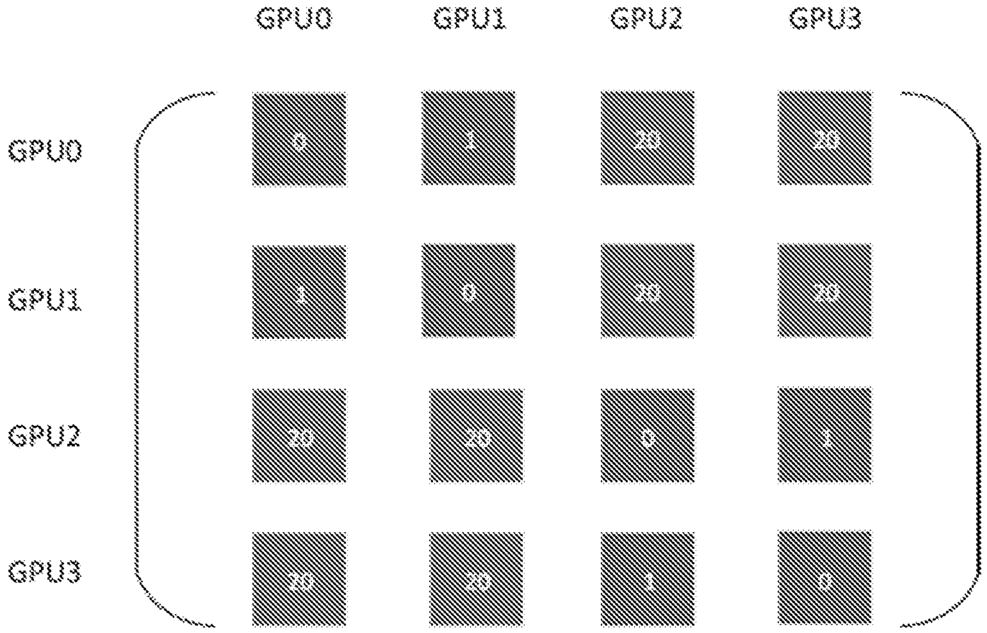
FIG. 3 is a schematic diagram for calculating a GPU communication factor in embodiment 1 of the present disclosure.

In step S203, according to a GPU static topology graph in a GPU physical topology graph, determining a GPU topology communication factor. FIG. 3 is a schematic diagram for calculating a GPU communication factor in embodiment 1 of the present disclosure. A value of comm_cost between a GPU0 card and a GPU1 card is 1; and a value of comm_cost between the GPU0 card and a GPU2 card is 20. So, a method of determining the GPU topology communication factor is that:

$$GpusCommunicateCost = \sum_{i}^{n}\sum_{j}^{n} GpuCommCost(i, j), \forall i \neq j$$

wherein GpusCommunicateCost is the GPU topology communication factor; i is a row of a GPU square matrix in the GPU static topology graph; j is a column of the GPU square matrix in the GPU static topology graph; and n is a number of GPU cards.

In step S204, according to the NUMA packet structure and the job information, determining the GPU fragmentation factor by adding a correction during GPU fragment calculation, wherein a method of determining the GPU fragmentation factor is that:

$$GpusFragmentCost = \left[\left(\sum_{1}^{sockets}\left(FreeGpusSocket(i)/TotalGpusSocket(i)\right)\right)/\text{sockets}\right] - MinFrags$$

wherein GpusFragment is the GPU fragmentation factor; FreeGpusSocket(i) is the number of rest free available gpus in the socket packet after to-be-allotted gpus in an $i^{th}$ socket packet is calculated;

TotalGpusSocket(i) is to calculate the number of all the gpus in the $i^{th}$ socket packet; sockets is the number of NUMA packets; and min_frags is a correction parameter.

In the present disclosure, the fragmentation rate of GPUs with available free spaces are corrected by the correction parameter. With regard to, in FIG. 1, the situation that it is necessary to allot 2 GPUs, on the condition without adding the correction parameter, values calculated with the B group policy 2 and a B group policy 3 according to a formula without adding the correction parameter are the same. However, it is obvious that, in the B group policy 2, the fragmentation rate of SOCKET0 is 50%, and the fragmentation rate of SOCKET1 is 50%. In the B group policy 3, the fragmentation rate of SOCKET0 is 0, and 4 GPUs for SOCKET1 may all be allotted. The B group policy 3 is the policy meeting a minimal degree of GPU allocation fragments. So, addition of the correction parameter may guarantee that each scheduling job may use an optimal configuration of the currently available GPU resources.

In step S204, performing a weighted calculation on the obtained communication factor and fragmentation factor to determine a target function value; and on the condition that the target function value is minimal, this solution is the optimal allocation solution for the GPU resources, wherein an expression of determining a target function is as follows: Y=α*GpusCommunicateCost+β*GpusFragmentCost;

wherein Y is the target function; α is a communication factor coefficient; β is the fragmentation factor; and α+β=1. It may be set that α=0.5, and β=0.5; or α=0.6, and β=0.4. The protection scope of the present disclosure is not limited to the embodiments.

In step S205, determining the optimal allocation solution for the GPU resources.

Figure 4:
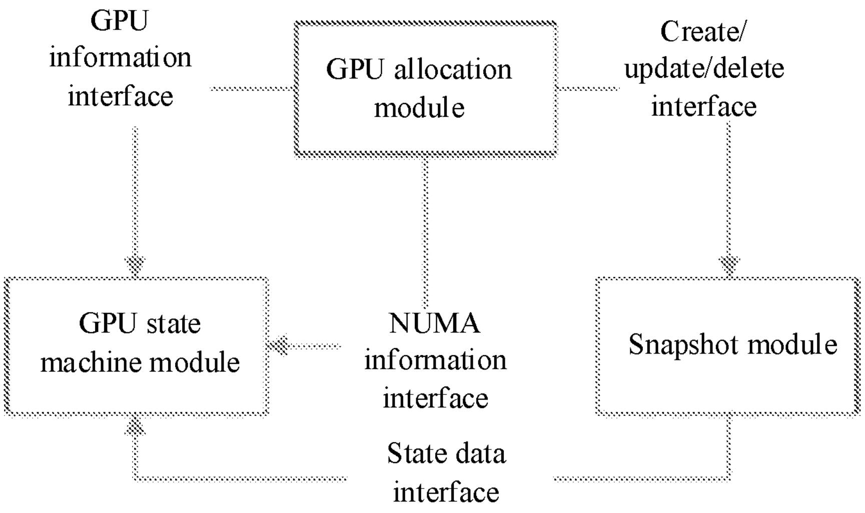
FIG. 4 is a schematic diagram of an efficient GPU resource allocation optimization system in embodiment 1 of the present disclosure.

The present disclosure further provides an efficient GPU resource allocation optimization system. FIG. 4 is a schematic diagram of the efficient GPU resource allocation optimization system in embodiment 1 of the present disclosure. The efficient GPU resource allocation optimization system includes a GPU allocation module, a GPU state machine module and a snapshot module.

After the GPU allocation module, the GPU state machine module and the snapshot module are started in sequence, an allocation apparatus provides a resource allocation interface for the external.

The GPU allocation module is configured to acquire the GPU resources by calling the GPU allocation interface and acquire the GPU data information from the GPU state machine module, calculate the GPU topology communication factor and the GPU fragmentation factor according to the acquired GPU resources and GPU data information, perform a weighted calculation on the obtained GPU communication factor and the GPU fragmentation factor to determine the target function value and call the snapshot module.

The GPU state machine module is configured to provide the GPU data information for the GPU allocation module, edit job information and update the NUMA packet at the same time.

The snapshot module is configured to store the updated optimal allocation solution for the GPU resources.

The GPU data information includes the GPU physical topology graph structure, the NUMA packet structure and the job information.

The process that the GPU allocation module calculates the GPU topology communication factor and the GPU fragmentation factor according to the acquired GPU resources and GPU data information, and the process of performing a weighted calculation on the obtained GPU communication factor and the GPU fragmentation factor to determine the target function value includes: determining the GPU topology communication factor according to the GPU static topology graph in the GPU physical topology graph; according to the NUMA packet structure and the job information, determining the GPU fragmentation factor by adding a correction during GPU fragment calculation; and conducting weighted calculation on the obtained communication factor and fragmentation factor to determine the target function value, wherein when the target function value is minimal, this solution is the optimal allocation solution for the GPU resources.

Although the specific embodiments of the present disclosure are described in combination with the accompanying drawings, they do not limit the scope of protection of the present disclosure. For those skilled in the art, other different forms of modification or deformation may be made based on the above description. It is unnecessary and impossible to enumerate all embodiments here. According to the technical solution of the present disclosure, various modifications or deformations that may be made by those skilled in the art without creative work are still within the protection scope of the present disclosure.

The invention claimed is:

1. An efficient graphics processing unit resource allocation optimization method, applied to a cluster system, the cluster system comprises a plurality of server nodes, and the plurality of server nodes comprise a plurality of graphics processing unit devices, wherein the method comprises:

S1: acquiring, by a server node, graphics processing unit resources and data information required by graphics processing unit allocation for a to-be-scheduled job, wherein the data information includes a graphics processing unit physical topology graph structure of the plurality of graphics processing unit devices, a non uniform memory access packet structure and job information;

S2: according to a graphics processing unit static topology graph in a graphics processing unit physical topology graph, determining, by the server node, a graphics processing unit topology communication factor, and according to the non uniform memory access packet structure and the job information, determining a graphics processing unit fragmentation factor by adding a correction during graphics processing unit fragment calculation; and S3: performing, by the server node, a weighted calculation on the obtained communication factor and fragmentation factor to determine a target function value, wherein on the condition that the target function value is minimal, this solution is an optimal allocation solution of the graphics processing unit resources for the to-be-scheduled job, and the optimal allocation solution is used to allocate the graphics processing unit resources required by the to-be-scheduled job according to currently running jobs on the cluster system and a use condition of the graphics processing unit resources;

wherein an expression of determining the graphics processing unit topology communication factor according to the graphics processing unit static topology graph in the graphics processing unit physical topology graph is as follows:

$$GpusCommunicateCost = \sum_{i}^{n}\sum_{j}^{n} GpuCommCost(i, j), \forall\, i \neq j$$

wherein GpusCommunicateCost is the graphics processing unit topology communication factor; i is a row of a graphics processing unit square matrix in the graphics processing unit static topology graph; j is a column of the graphics processing unit square matrix in the graphics processing unit static topology graph; and n is a number of graphics processing unit cards;

wherein an expression of, according to the non uniform memory access packet structure and the job information, determining the graphics processing unit fragmentation factor by adding a correction during graphics processing unit fragment calculation is as follows:

$$GpusFragmentCost = \left[\left(\sum_{1}^{sockets}\left(FreeGpusSocket(i)/TotalGpusSocket(i)\right)\right)/\text{sockets}\right] - MinFrags$$

wherein GpusFragment is the graphics processing unit fragmentation factor; FreeGpusSocket(i) is the number of rest free available gpus in a socket packet after to-be-allotted gpus in an $i^{th}$ socket packet is calculated; TotalGpusSocket(i) is to calculate the number of all the gpus in the $i^{th}$ socket packet; sockets is the number of non uniform memory access packets; and min_frags is a correction parameter;

wherein an expression of performing a weighted calculation on the obtained graphics processing unit communication factor and the graphics processing unit fragmentation factor to determine the target function value is as follows: $Y=\alpha*GpusCommunicateCost+\beta*GpusFragmentCost$;

wherein Y is the target function; $\alpha$ is a communication factor coefficient; $\beta$ is the fragmentation factor; and $\alpha+\beta=1$;

wherein before execution of operation S1, the method further comprises: calling a graphics processing unit allocation interface, wherein the allocation interface is configured to acquire the graphics processing unit resources required by graphics processing unit allocation.

2. The efficient graphics processing unit resource allocation optimization method according to claim 1, wherein after execution of operation S3, the method further comprises: updating the optimal allocation solution for the graphics processing unit resources, and completing persistence.

3. An efficient graphics processing unit resource allocation optimization system, comprising:

a memory, configured to store a computer program; and a processor, configured to implement the operations comprising:

S1: acquiring graphics processing unit resources and data information required by graphics processing unit allocation for a to-be-scheduled job, wherein the data information includes a graphics processing unit physical topology graph structure of a plurality of graphics processing unit devices, a non uniform memory access packet structure and job information;

S2: according to a graphics processing unit static topology graph in a graphics processing unit physical topology graph, determining a graphics processing unit topology communication factor, and according to the non uniform memory access packet structure and the job information, determining a graphics processing unit fragmentation factor by adding a correction during graphics processing unit fragment calculation; and S3: performing a weighted calculation on the obtained communication factor and fragmentation factor to determine a target function value, wherein on the condition that the target function value is minimal, this solution is an optimal allocation solution of the graphics processing unit resources for the to-be-scheduled job, and the optimal allocation solution is used to allocate the graphics processing unit resources required by the to-be-scheduled job according to currently running jobs on a cluster system and a use condition of the graphics processing unit resources;

wherein an expression of determining the graphics processing unit topology communication factor according to the graphics processing unit static topology graph in the graphics processing unit physical topology graph is as follows:

$$GpusCommunicateCost = \sum_{i}^{n}\sum_{j}^{n} GpuCommCost(i, j),\ \forall\, i \neq j$$

wherein GpusCommunicateCost is the graphics processing unit topology communication factor; i is a row of a graphics processing unit square matrix in the graphics processing unit static topology graph; j is a column of the graphics processing unit square matrix in the graphics processing unit static topology graph; and n is a number of graphics processing unit cards;

wherein an expression of, according to the non uniform memory access packet structure and the job information, determining the graphics processing unit fragmentation factor by adding a correction during graphics processing unit fragment calculation is as follows:

$$GpusFragmentCost = \left[\left(\sum_{1}^{sockets}\left(FreeGpusSocket(i)/TotalGpusSocket(i)\right)\right)/\text{sockets}\right] - MinFrags$$

wherein GpusFragment is the graphics processing unit fragmentation factor; FreeGpusSocket(i) is the number of rest free available gpus in a socket packet after to-be-allotted gpus in an $i^{th}$ socket packet is calculated; TotalGpusSocket(i) is to calculate the number of all the gpus in the $i^{th}$ socket packet; sockets is the number of non uniform memory access packets; and min_frags is a correction parameter;

wherein an expression of performing a weighted calculation on the obtained graphics processing unit communication factor and the graphics processing unit fragmentation factor to determine the target function value is as follows: $Y=\alpha*GpusCommunicateCost+\beta*GpusFragmentCost$;

wherein Y is the target function; $\alpha$ is a communication factor coefficient; $\beta$ is the fragmentation factor; and $\alpha+\beta=1$;

wherein before execution of operation S1, the operations further comprise: calling a graphics processing unit allocation interface, wherein the allocation interface is configured to acquire the graphics processing unit resources required by graphics processing unit allocation.

4. The efficient graphics processing unit resource allocation optimization system according to claim 3, wherein after execution of operation S3, the operations further comprise: updating the optimal allocation solution for the graphics processing unit resources, and completing persistence.

5. The efficient graphics processing unit resource allocation optimization method according to claim 1, wherein the correction parameter is capable for correcting the fragmentation rate of the graphics processing units with available free spaces.

6. The efficient graphics processing unit resource allocation optimization method according to claim 1, wherein a GPU fragment index is represented by a GPU idle rate of an average socket.

7. The efficient graphics processing unit resource allocation optimization method according to claim 1, wherein $\alpha=0.5$, and $\beta=0.5$, or $\alpha=0.6$, and $\beta=0.4$.

8. The efficient graphics processing unit resource allocation optimization system according to claim 3, wherein the correction parameter is capable for correcting the fragmentation rate of the graphics processing units with available free spaces.

9. The efficient graphics processing unit resource allocation optimization system according to claim 3, wherein $\alpha=0.5$, and $\beta=0.5$, or $\alpha=0.6$, and $\beta=0.4$.

10. The efficient graphics processing unit resource allocation optimization system according to claim 3, wherein a GPU fragment index is represented by a GPU idle rate of an average socket.

11. A non-transitory computer-readable storage medium, wherein a computer program is stored on the storage medium, and when the computer program is executed by a processor, implementing the operations comprising:

S1: acquiring graphics processing unit resources and data information required by graphics processing unit allocation for a to-be-scheduled job, wherein the data information includes a graphics processing unit physical topology graph structure of a plurality of graphics processing unit devices, a non uniform memory access packet structure and job information;

S2: according to a graphics processing unit static topology graph in a graphics processing unit physical topology graph, determining a graphics processing unit topology communication factor, and according to the non uniform memory access packet structure and the job information, determining a graphics processing unit fragmentation factor by adding a correction during graphics processing unit fragment calculation; and S3: performing a weighted calculation on the obtained communication factor and fragmentation factor to determine a target function value, wherein on the condition that the target function value is minimal, this solution is an optimal allocation solution of the graphics processing unit resources for the to-be-scheduled job, and the optimal allocation solution is used to allocate the graphics processing unit resources required by the to-be-scheduled job according to currently running jobs on a cluster system and a use condition of the graphics processing unit resources;

wherein an expression of determining the graphics processing unit topology communication factor according to the graphics processing unit static topology graph in the graphics processing unit physical topology graph is as follows:

$$GpusCommunicateCost = \sum_{i}^{j}\sum_{j}^{n} GpuCommCost(i, j) \forall\, i \neq j$$

wherein GpusCommunicateCost is the graphics processing unit topology communication factor; i is a row of a graphics processing unit square matrix in the graphics processing unit static topology graph; j is a column of the graphics processing unit square matrix in the graphics processing unit static topology graph; and n is a number of graphics processing unit cards;

wherein an expression of, according to the non uniform memory access packet structure and the job information, determining the graphics processing unit fragmentation factor by adding a correction during graphics processing unit fragment calculation is as follows:

$$GpuFragmentCost = \left[\left(\sum_{1}^{sockets}\left(FreeGpusSocket(i)/TotalGpusSocket(i)\right)\right)/\text{sockets}\right] - MinFrags$$

wherein GpusFragment is the graphics processing unit fragmentation factor; FreeGpusSocket(i) is the number of rest free available gpus in a socket packet after to-be-allotted gpus in an $i^{th}$ socket packet is calculated; TotalGpusSocket(i) is to calculate the number of all the gpus in the $i^{th}$ socket packet; sockets is the number of non uniform memory access packets; and min_frags is a correction parameter;

wherein an expression of performing a weighted calculation on the obtained graphics processing unit communication factor and the graphics processing unit fragmentation factor to determine the target function value is as follows: $Y=\alpha$*GpusCommunicateCost+$\beta$*GpusFragmentCost;

wherein Y is the target function; $\alpha$ is a communication factor coefficient; $\beta$ is the fragmentation factor; and $\alpha+\beta=1$;

wherein before execution of operation S1, the operations further comprise: calling a graphics processing unit allocation interface, wherein the allocation interface is configured to acquire the graphics processing unit resources required by graphics processing unit allocation.

* * * * *